United States Patent Office 3,336,416
Patented Aug. 15, 1967

3,336,416
POLYESTER MOULDING MASSES CONTAINING TERTIARY AMINE AND TRIARYL PHOSPHINE
Erich Eimers and Hermann Schirmer, Krefeld, and Klaus Prater, Krefeld-Bockun, Germany, assignors to Farbenfabriken Bayer Aktiengesellschaft, Leverkusen, Germany, a corporation of Germany
No Drawing. Filed Jan. 29, 1965, Ser. No. 429,140
Claims priority, application Germany, Feb. 8, 1964, F 41,966
4 Claims. (Cl. 260—864)

The present invention is concerned with polyester moulding masses.

Polyester moulding masses from unsaturated polyesters and monomeric unsaturated compounds copolymerizable therewith with a content of tertiary aromatic amines, can be hardened to moulded articles and coatings by the addition of diacyl peroxides at room temperature, without the external supply of heat. Since, when the mentioned amines and peroxides are simultaneously used, there exists a risk of explosive decomposition as a result of insufficient mixing, the amines are, as a rule, already added to the polyester moulding masses by the manufacturer or possibly even chemically incorporated into the unsaturated polyesters. Thus, the working up of the mixtures becomes simple and free of danger since these moulding masses have only to be mixed with the amount of a diacyl peroxide necessary for hardening at room temperature.

However, the amine-containing, cold-hardening polyester moulding masses still possess a number of disadvantages which have an unfavourable effect on the working up. In particular, more or less strong discolorations appear upon storage. The storage stability is also considerably worse than in the case of the corresponding amine-free masses. Finally, the reactivity of the amine-containing polyester moulding masses gradually decreases on storage.

We have now found that the mentioned disadvantages are avoided and tertiary aromatic amine-containing, cold-hardening polyester moulding masses are obtained which have an outstanding storage stability and a reactivity which does not change after prolonged storage, which exhibit no discolorations upon storage and which, after the addition of a diacyl peroxide, harden even more quickly than the known masses, when small amounts of a triaryl phosphine are added to the polyester moulding masses.

Thus, the present invention is concerned with polyester moulding masses of unsaturated polyesters with radicals of α,β-unsaturated dicarboxylic acids and of monomeric, unsaturated co-polymerizable compounds and a content of tertiary aromatic amines, possibly incorporated into the unsaturated polyesters, which can be hardened at room temperature, after the addition of a diacyl peroxide, to give valuable moulded articles or coatings, and which are characterized by a content of an optionally substituted triaryl phosphine.

The triaryl phosphine can be added either to the unsaturated polyesters or to their solutions in co-polymerizable monomeric compounds in amounts of about 0.05 to 1 percent by weight, preferably 0.3 to 0.5 percent by weight, referred to the polyester moulding masses.

Examples of triaryl phosphines which may be used include triphenyl, tritolyl, tri-(p-chlorophenyl) and trinaphthyl phosphine and their alkyl-, cycloalkyl- and/or aryl-substitution products.

Unsaturated polyesters in the meaning of the present invention are all the usual unsaturated polyesters which essentially contain radicals of an α,β-unsaturated dicarboxylic acid, such as fumaric acid, maleic acid, itaconic acid, mesaconic acid or citraconic acid, as well as optionally the radicals of other mono- or polybasic, possibly unsaturated carboxylic acids, such as succinic acid, glutaric acid, adipic acid, phthalic acid, isophthalic acid, terephthalic acid, tetrachlorophthalic acid, tetrahydrophthalic acid, endomethylene-tetrahydrophthalic acid, hexachloromethylene-tetrahydrophthalic acid, benzoic acid or their alkyl-substitution products, oleic acid, linseed oil fatty acid and ricinic acid, as well as radicals of optionally unsaturated, optionally halogenated, optionally aryl- or alkyl-substituted alcohols, such as ethylene glycol, polyethylene glycols, butylene-1,3-glycol, propylene-1,2-glycol, dipropylene glycol, glycerol, trimethylol-propane, pentaerythritol, and their partial ethers with optionally unsaturated alcohols, di- and triethanolamine, thiodiglycol, β,β'-dihydroxy-diethyl sulphone, 1,4-methylol-cyclohexane, dihydroxy-dicyclohexyl-alkanes and dialkoxybisphenols.

Unsaturated co-polymerizable monomeric compounds are, for example, styrene, α-methyl-styrene, vinyl-toluene, p-chloro- or p-bromo styrene, acrylic acid and methacrylic acid alkyl esters, especially methyl and butyl esters, esters and ethers of allyl alcohol, such as diallyl phthalate, triallyl phosphate and triallyl cyanurate, as well as polyallyl ethers of polybasic aliphatic alcohols, such as glycerol or tri-methylol-propane triallyl ethers and pentaerythritol tetraallyl ether, as well as vinyl acetate, vinyl benzoate, vinyl butyl ether and divinyl ether, divinyl sulphone, ethyl vinyl sulphone and vinyl phosphonic acid ester, as well as their mixtures.

Tertiary aromatic amines in the meaning of the present invention are, for example, N,N-dimethyl-aniline, N,N-diethyl-aniline, N,N-dibenzyl-aniline, N,N-dimethyl-toluidine and N,N-dimethyl-α- or -β-naphthylamine, as well as tertiary amines which contain esterifiable groups, such as N,N-diethoxy-p-toluidine, N,N-methyl-ethoxy-aniline, N-phenylamino - diacetic acid, p-dimethylamino-benzoic acid and pyridine-carboxylic acids.

The last mentioned amines can be condensed into the unsaturated polyesters used during the production thereof. There can possibly also be mixed with the polyester moulding masses according to the present invention, those polyesters which contain tertiary aromatic amines incorporated therein, besides other amine-free unsaturated polyesters.

The amine content preferably amounts to 0.05 to 5 percent by weight.

The amine-containing polyester moulding masses according to the present invention may be still further stabilized by materials customarily used for this purpose. Examples of stabilizers of this type are hydroquinone, 2,5-di-tert.-butyl-p-benzoquinone, chloranil, pyrogallol, phloro-glucinol and copper naphthenate.

In the following examples, which are given for the purpose of illustrating the present invention, the parts are parts by weight and the percentages are percentages by weight:

EXAMPLE 1

An unsaturated polyester produced from 3246 parts propylene-1,2-glycol, 1855 parts maleic anhydride and 3140 parts phthalic anhydride, with the addition of 0.547 part hydroquinone, is dissolved in styrene to give a solution with 71.7% solids content. Then there are also added 0.013% hydroquinone and 0.1% diethoxy-p-toluidine.

The cold-hardening polyester moulding mass obtained is divided into two parts A and B. Part A is mixed with 0.3% triphenyl phosphine, whereas part B remains without addition. Both solutions are hardened at 20° C. by the addition of a 4% benzoyl peroxide paste (50% in dibutyl phthalate). The hardening time without the addition of triphenyl phosphine is 65'30", whereas with the addition of triphenyl phosphine it is only 31'48".

EXAMPLE 2

Two different polyester moulding masses A and B are produced and the moulding mass A, which contains a tertiary aromatic amine and a triaryl phosphine, is mixed with the amine- and phosphine-free moulding mass B.

Production of the polyester moulding mas A

By the eseterification of 888 parts butylene-1,3,-glycol, 598 parts ethylene glycol, 1855 parts phthalic anhydride and 660 parts maleic anhydride, there is produced an unsaturated polyester of acid number 40 which, with the addition of 0.0075% hydroquinone, is dissolved in styrene to give a solution with 65% solids content. The solution obtained is mixed with 1% N,N-diethyl-aniline. This solution is divided into two parts A and $A_1$, but only part $A_1$ is mixed with 0.3% triphenyl phosphine.

Production of the polyester moulding mass B

By esterification of 2024 parts butylene-1,3-glycol, 2255 parts phthalic anhydride and 638 parts maleic anhydride, with the addition of 0.667 part hydroquinone, there is produced an unsaturated polyester of acid number 30 which, with the addition of 0.6 part hydroquinone, is dissolved in styrene to give a solution with a 75% solids content.

For hardening at room temperature, 20 parts of each of the moulding masses A or $A_1$ are mixed with 80 parts of the moulding mass B and stirred with a 4% benzoyl peroxide paste. Table I shows the reactivity of the polyester moulding masses according to the present invention which remains practically unchanged, even after prolonged storage.

TABLE I

| Polyester moulding mass | Hardening time (minutes) | |
|---|---|---|
| | Immediately after production | After 15 week's storage of the polyester moulding masses A or $A_1$ before mixing with B at 25° C. |
| 20 parts A, 80 parts B | 98 | 110 |
| 20 parts $A_1$, 80 parts B | 89 | 85 |

Table II shows the improved stability corresponding to the increased gelling time, as well as the colour stability of the peroxide-free polyester moulding masses according to the present invention.

TABLE II

| Polyester moulding mass | Gelling time at 100°C., without hardener, in minutes | Iodine colour number according to German Industrial Standard No. 6162 | |
|---|---|---|---|
| | | Immediately after production | After 11 week's storage at 25° C. |
| A | 180 | 4 greenish | Deep dark green. |
| $A_1$ | 330 | ----do---- | 4 greenish. |

EXAMPLE 3

By esterification of 1341 parts propylene-1,2-glycol, 759 parts dipropylene glycol, 1065 parts maleic anhydride and 1678 parts phthalic anhydride, as well as 50 parts diethoxy-p-toluidine, there is produced, as described in German patent specification No. 919,431, an unsaturated polyester of acid number 29.3 which, with the addition of 0.02182% hydroquinone, is dissolved in styrene to give a solution with a 71.5% solids content. The storage stability and hardening time of the polyester moulding mass obtained, with and without the addition of triphenyl phosphine, is given in the following Table III.

TABLE III

| Triphenyl phosphine, percent | Hardening time [1] | | Gelling time at 60° C., without hardener, hours |
|---|---|---|---|
| | Immediately | After 3 week's storage | |
| -------- | 16'30"<br>14' | 24'40"<br>15'05" | 237 |
| 0.3 | | | 475 |

[1] The hardening takes place at 20° C. with the addition of a 4% benzoyl peroxide paste (50% in dibutyl phthalate).

In the foregoing examples the solids content (polyester content) of the moulding masses amounts between 65 and 75 percent by weight. However, it must be pointed out that the scope of the invention is not limited to such contents. As usual, the rate of polyester to monomeric compounds may even vary within wide limits and can amount between about 1:2 and about 4:1 parts by weight.

What we claim is:

1. A polyester moulding composition of improved storage stability, said composition consisting essentially of a solution of an unsaturated polyester which comprises the esterification reaction product of a polyol and an α,β-unsaturated dicarboxylic acid in a monomeric, unsaturated, copolymerizable compound together with a tertiary aromatic amine and a storage stabilizing amount of a triaryl phosphine, said composition being hardenable at room temperature upon the addition of a diacyl peroxide.

2. The composition of claim 1 wherein the triaryl phosphine is present in an amount of about 0.05 to 1.0% by weight, based on the weight of said composition.

3. The composition of claim 1 wherein the triaryl phosphine is present in an amount of from 0.3 to 0.5% by weight, based on the weight of said composition.

4. The composition of claim 1 wherein the said tertiary aromatic amine is present in an amount of 0.05 to 5.0% by weight, based on the weight of said composition.

References Cited

UNITED STATES PATENTS

| 2,520,601 | 8/1950 | Lee | 260—865 |
| 3,001,967 | 9/1961 | Willersinn | 260—864 |
| 3,239,581 | 3/1966 | Raichle et al. | 260—864 |
| 3,274,291 | 9/1966 | Raichle et al. | 260—863 |

FOREIGN PATENTS

| 605,529 | 9/1960 | Canada. |
| 1,331,003 | 3/1963 | France. |

MURRAY TILLMAN, *Primary Examiner.*

J. T. GOOLKASIAN, *Assistant Examiner.*